Nov. 19, 1968  A. L. NASVYTIS  3,411,370
TORQUE RESPONSIVE MULTI-ROLLER FRICTION DRIVE
Filed Dec. 27, 1966  3 Sheets-Sheet 3

INVENTOR.
Algirdas L. Nasvytis
BY Hill, Sherman, Meroni, Gross & Simpson
ATTORNEYS

# United States Patent Office 3,411,370
Patented Nov. 19, 1968

3,411,370
TORQUE RESPONSIVE MULTI-ROLLER FRICTION DRIVE
Algirdas L. Nasvytis, Cleveland, Ohio, assignor to TRW Inc., Cleveland, Ohio, a corporation of Ohio
Filed Dec. 27, 1966, Ser. No. 604,736
9 Claims. (Cl. 74—208)

ABSTRACT OF THE DISCLOSURE

A friction gear system employing an output annular ring member and a concentric input sun member drivingly engaged by three rows of friction rollers. A two part carrier is provided, each part rigidly carrying alternate rollers of the outer row. A lost motion connection is provided between the carrier parts and a lever system is provided to rotate one carrier part relative to the other a limited distance to maintain a given preload to the gear system dependent on the transmitted torque.

---

The present invention relates to mechanical drive transmission systems and is, more particularly, concerned with the provision of a novel and substantially improved gearing system in which preload is automatically modified in a simple manner to increase as the torque transmitted by the system is increased, and vice versa. As those skilled in the art of planetary gearing and related systems are aware, friction gearing of the planetary type offers many advantages. Friction gearing is essentially noiseless and has many cost advantages. However, the transmission of varying torques by a friction gearing transmission is difficult unless means are provided for varying the radial preload of the friction rollers. In my prior application for U.S. patent Ser. No. 514,063, filed Dec. 15, 1965, now Patent No. 3,364,761, under the heading "Torque Sensitive Multi-Roller Friction Drive," I have disclosed embodiments of friction drive systems incorporating automatic torque response. The system of the present application provides a refined torque responsive drive similar in intended ultimate function as that disclosed in my above-mentioned copending application. However, as a result of a simplified construction, the number of floating parts is reduced and the various drive transmitting rollers are substnatially more accurately correlated with each other.

In accordance with the improvements of the present application, I provide a compound friction gear system employing an annular ring member and a sun member between which are three rows of friction roller members. In the construction of the preferred embodiments, the sun gear and ring gear are the respective inlet and outlets, or vice versa, while the intermediate friction rollers are mounted for limited movement about the axis of the input and output shafts. In the embodiment of the invention illustrated, three rows of intermediate friction rollers are employed. In such multiple roll drive systems it has been found that instability has been considered a highly undesirable, though universal, problem. However, the forces developed in such a multi-roll system, and inherent thereto, are employed in accordance with the present invention to provide a radial preload directly related to the torque being transmitted by the system. In accordance with the present invention, the variable preload acts to provide improved drive efficiency. It has been found that the most efficient friction drive system incorporates a radial preload condition between the drive rollers in an amount just sufficient to carry the torque load at which the system is running. If the preload is greater than necessary to carry the load intended, the friction losses in the drive system are excessively high and excessive wear develops. On the other hand, if the preload condition is insufficiently great to carry the torque imparted to the system by the input shaft, slippage between the friction surfaces of the rollers and their cooperating components will occur. Slippage is very deleterious to the friction drive surfaces of the system and can, under heavy load service, cause flat spots or other discontinuities in the system, rendering it inoperative.

In accordance with the present invention, an extremely rugged system is provided in which preload is automatically varied from a minimum in which all of the rollers are barely in driving contact to a maximum torque transmitting condition in which preload is at a maximum and in which the entire drive system is substantially symmetrically positioned. In accordance with the present invention, this is accomplished through the utilization of a pair of coaxially mounted carrier elements positioned immediately adjacent one another. The two carrier members rigidly carry alternating rollers of the last row of rollers of the drive system. With this relationship angular relative rotation between the carrier members provides relative peripheral movement between rollers of the carrier mounted row. It has been found by theoretical analysis and as a result of substantial experimentation and actual transmission of torque, that as the rollers in the last row of intermediate rollers are moved away from an equally spaced condition the radial preload in the system decreases until the parts may have no preload at all. In this condition the parts may readily be assembled without complicated assembly fixtures. As the rollers are moved toward equal spacing, the preload increases to a maximum condition which is reached when the rollers are essentially equally spaced.

In the present system, relative movement between the two carrier members is achieved by an abutment member pivotally carried by one carrier and reacting against the other. The abutment member also contacts a fixed housing of the transmission system. As a result of this arrangement, any movement of the two carriers relative to the housing will cause a reaction on the abutment which in turn causes relative rotation between the two carrier members. Spring means is carried by one of the carriers and contacts the other to bias them toward a condition of maximum unevenness of roller position, thereby tending to maintain the drive system at a minimum preload level. With increasing torque transmission the reaction forces act against the spring to move the rollers toward the even condition, thereby automatically increasing the torque carrying capabilities of the system as increasing torque levels are applied to the drive.

It is, accordingly, an object of the present invention to provide an improved torque-responsive friction drive system.

Another object of the invention is to provide a torque-responsive friction drive system wherein the rollers arranged for torque-responsive adjustment are positioned radially fixedly relative to the axis of rotation of the drive system and are permitted peripheral adjustment only.

A feature of the invention is the provision of a pair of relatively rotatable carrier members each providing fixed pivots for alternating rollers of the drive.

Another feature of the invention is the provision of a pair of carrier members relatively movable through a limited arc under the control of cantilever springs. Still other and further objects and features of the invention will at once become apparent to those skilled in the art from a consideration of the attached drawings and specification wherein one embodiment of the invention is shown by way of illustration only, and wherein.

As shown on the drawings.

Figure 3:
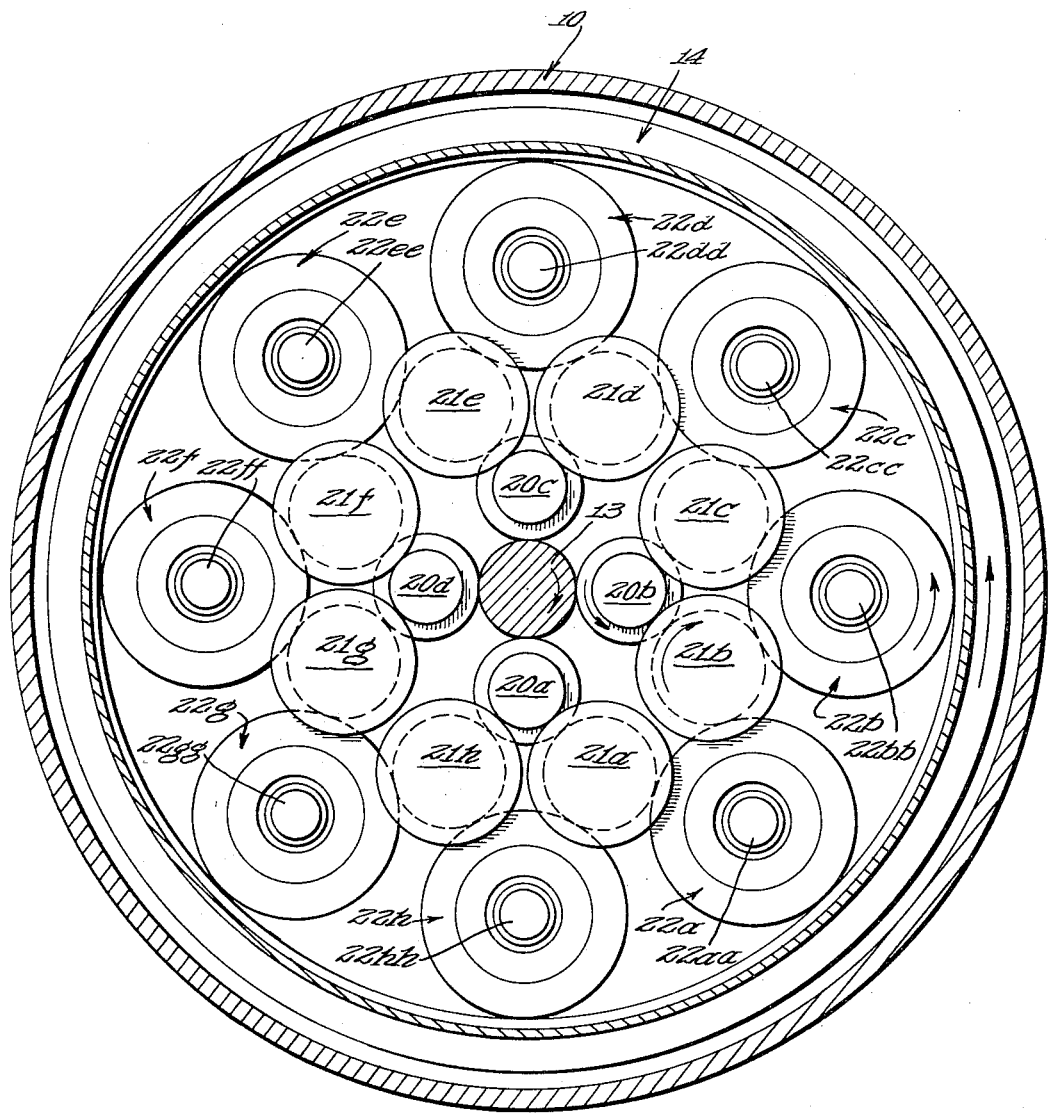
FIGURE 3 is a cross-sectional view of the drive system shown in FIGURE 1 and taken along the line III—III.

As can be seen from a study of the drawings, the drive system of the present invention incorporates a fixed housing 10 rotatably carrying an input shaft 11 supported in bearings 12. An output shaft 13 is supported by any convenient means, not shown, for rotation coaxial with the shaft 11. Input shaft 10 is secured to an annular ring member 14 by means of a retainer 15 secured to flange 11a of shaft 11 and incorporating an annular splined sleeve 16 cooperating with splines 11b and 14b on the shaft 11 and ring 14 respectively. Bewteen the ring 14 and the shaft 13 which may be termed a sun member, intermediate roller members are provided. These rollers comprise three rows, the rollers in the first row being numbered, as shown in FIGURE 3, as 20a, 20b, 20c, and 20d. The rollers of the second row are numbered 21a through 21h. The rollers of the third or outermost row of rollers are numbered 22a through 22h.

The position of the intermediate rollers is determined by a pair of carrier members 24 and 25 which are arranged to accurately position the rollers of the third row. Thus, as may be seen from a consideration of FIGURES 1 and 3, the carrier member 25 rigidly carries pivots 22bb, 22dd, 22ff and 22hh while the carrier 24 rigidly carries the alternate pivots 22aa, 22cc, 22ee and 22ff.

The carrier members 24 and 25 are rotatable slightly relative to one another, through a distance controlled by stops 33 and 34 carried by carrier member 25 and cooperable with pins 31 passing through the carrier 25 and rigidly secured to carrier 24. Cantilever spring means 30 are rigidly secured to carrier member 25 by screws 30a and are accurately fixedly positioned thereto by means of guide pins 30b. Accordingly, as viewed in FIGURE 1, counterclockwise movement of the carrier 24 relative to the carrier 25 is permitted, against the resistance of springs 30 until the springs 30 are against the adjusting screws 34a of abutments 34. The carrier 25 is secured against rotation relative to the housing 10 by means of a pivotal abutment member 26 in toothed relation with peripheral segment 27 secured to housing 10. A pivotal abutment member 26 is pivotally mounted about the shafts 22bb, 22dd, 22ff, 22hh of the respective rollers 22b, 22d, 22f, 22h and pivotal motion of the abutment members 26 in a clockwise manner around their pivots will cause movement of the carrier members 24 in a counterclockwise direction relative to carrier 25 due to the abutments 29, carried by the abutment members 26, against abutments 28 carried by the carrier 24.

Figure 1:
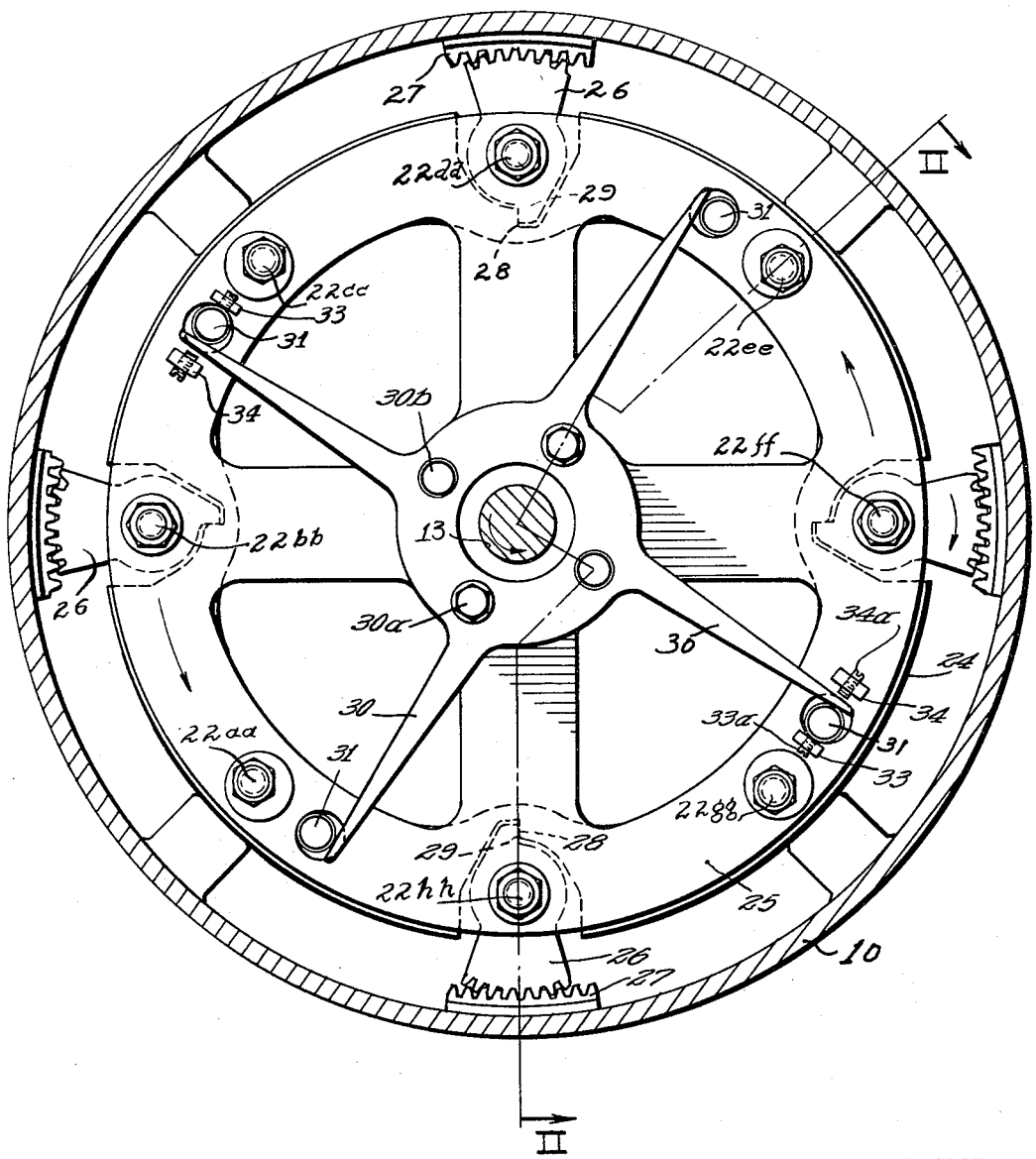
FIGURE 1 is a side view of the drive system constructed in accordance with the present invention, in partial cross-section.
Figure 2:
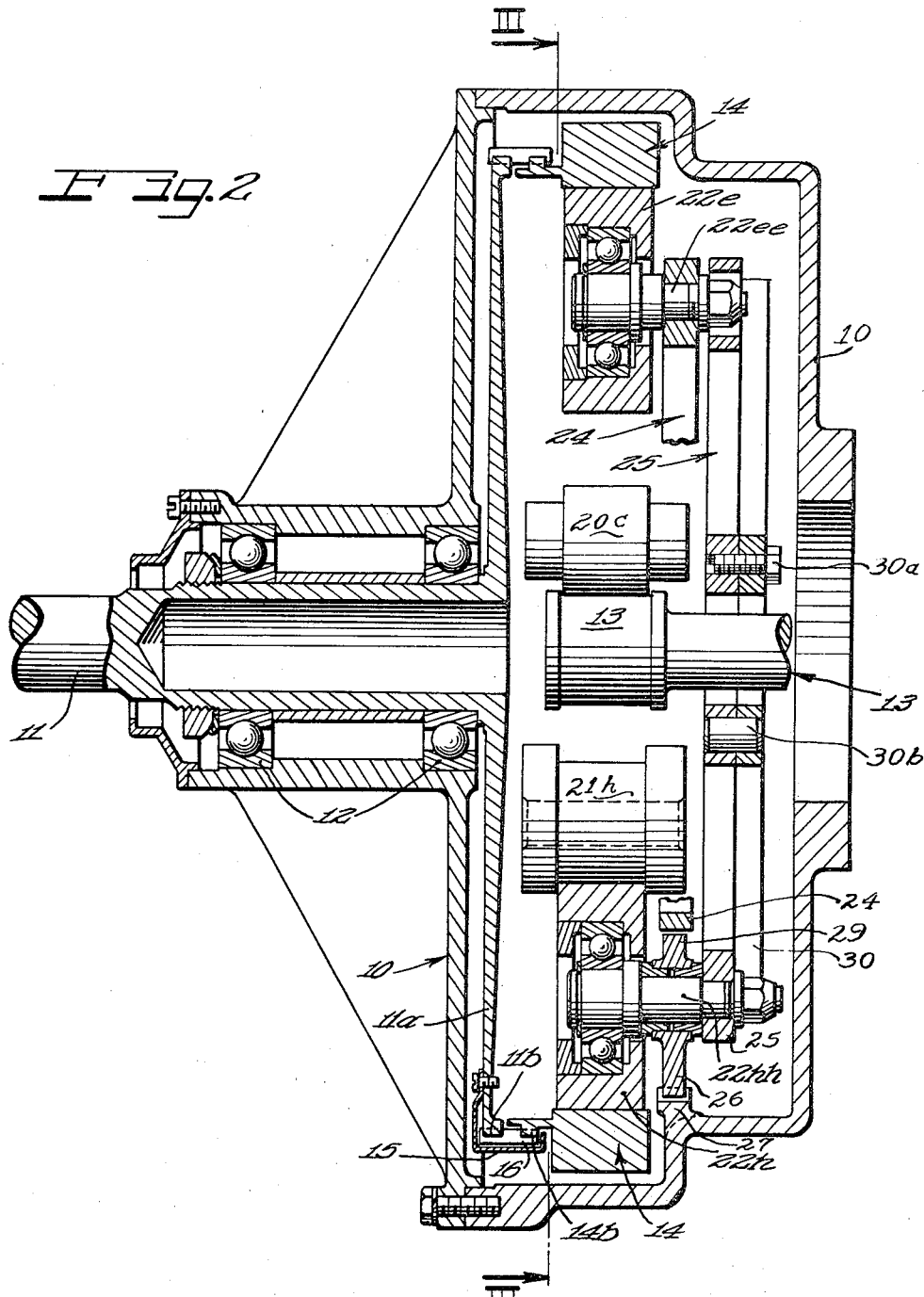
FIGURE 2 is a cross-sectional view of the drive shown in FIGURE 1 taken along the line II—II.

It will be clear that with counterclockwise shaft rotation of the sun 13, as viewed in FIGURE 1, and with the employment of an odd number of rows of rollers, three in the present case, a resistance to movement of the output ring will tend to cause rotation of the carriers in the same direction as a rotation of the sun 13. Accordingly, with increased torque the carriers will tend to rotate together in a counterclockwise direction as viewed in FIGURE 1 with, accordingly, a clockwise rotational tendency of the abutments 26 and hence, increased deflection of springs 30 and an increased tendency of all of the rollers 22 to assume an even spacing. As the evenness of the spacing increases, the preload on the rollers, occasioned by their equality of spacing, increases and the capability of the drive to transmit torque increases. As a result of this relationship, the minimum preload necessary to carry a particular torque is automatically provided, while at the same time excessive preloads for a given torque are avoided. This results in substantially increased drive efficiency over a wide range of torque requirements. It will be seen from the above, that I have provided an improved and yet very simple form of automatically torque-compensating friction drive. It will be clear to those skilled in the art that variations may be made in the structure without departing from the novel concepts of my invention.

I claim as my invention:

1. In combination in a friction drive system, a fixed housing, coaxial rotatable sun and ring members, a plurality of rows of intermediate friction rollers between said sun member and said ring member providing friction drive contract therebetween, at least one of said rows comprising an even number of rollers, two coaxial carrier members each rotatably carrying alternating rollers of said one row, spring means mounted on one of said carrier members and contacting spring reaction means on the other carrier member biasing said carrier members angularly relative to each other toward the condition in which said rollers of the two carrier members are at a maximum uneven spacing providing a minimum preload, pivotal abutment means on the other carrier member, abutment means on said one carrier contacting said pivotal abutments means and abutment means on said housing contacting said pivotal abutment means whereby torque reaction of said carriers is transmitted to said housing via said pivotal abutment means and causes pivoting thereof to force said carriers to rotate relative to each other against said spring means and toward a position of increasing evenness of roller spacing.

2. The friction drive system set forth in claim 1 wherein said spring means comprises radially directed cantilever springs rigidly secured on said one carrier member.

3. The friction drive combination set forth in claim 1 wherein the rollers of said one row are all rigidly secured at fixed radial distances from said sun member by their respective carriers.

4. The friction drive combination set forth in claim 1 wherein stop means are provided on said carrier members limiting relative movement in the direction of decreasing evenness of roller spacing.

5. The friction drive combination set forth in claim 1 wherein stop means are provided on said carrier members limiting relative movement therebetween in either direction.

6. The combination friction drive system set forth in claim 1 wherein said plurality of rows of intermediate friction rollers comprise three rows and wherein said coaxial carrier members carry alternating rollers of the radially outermost row of rollers.

7. The friction drive system set forth in claim 6 wherein the rollers of said carrier members are pivotal about axes rigidly secured to their respective carrier member.

8. The friction drive system set forth in claim 6 wherein stop means are provided on said carrier members limiting relative movement thereof in the direction of decreasing evenness of roller spacing.

9. The friction drive system set forth in claim 6 wherein stop means are provided on said carrier members limiting relative movement therebetween in either direction.

References Cited

UNITED STATES PATENTS

| 661,909 | 11/1900 | Foster | 74—208 |
|---|---|---|---|
| 827,204 | 7/1906 | Bauch | 74—213 X |
| 1,585,198 | 5/1926 | Matteucci | 74—208 X |
| 3,364,761 | 1/1968 | Nasvytis | 74—208 |

FOREIGN PATENTS 157,736  12/1932  Switzerland.

FRED C. MATTERN, Jr., *Primary Examiner.*

THOMAS C. PERRY, *Assistant Examiner.*